United States Patent
Bhatia

(10) Patent No.: US 7,912,905 B2
(45) Date of Patent: *Mar. 22, 2011

(54) SYSTEM AND METHOD FOR FILTERING NETWORK MESSAGES

(75) Inventor: Rishi Bhatia, Walpole, MA (US)

(73) Assignee: Computer Associates Think, Inc., Islandia, NY (US)

( * ) Notice: Subject to any disclaimer, the term of this patent is extended or adjusted under 35 U.S.C. 154(b) by 1207 days.

This patent is subject to a terminal disclaimer.

(21) Appl. No.: 10/847,923

(22) Filed: May 18, 2004

(65) Prior Publication Data

US 2006/0031307 A1  Feb. 9, 2006

(51) Int. Cl.
*G06F 15/16* (2006.01)
(52) U.S. Cl. ........ 709/206; 709/207; 709/217; 709/224; 726/4; 726/22; 726/26
(58) Field of Classification Search ............... 709/206, 709/207, 217, 224; 726/4, 22, 26
See application file for complete search history.

(56) References Cited

U.S. PATENT DOCUMENTS

| | | | | |
|---|---|---|---|---|
| 5,606,668 | A | 2/1997 | Shwed | 395/200.11 |
| 5,884,033 | A * | 3/1999 | Duvall et al. | 709/206 |
| 6,023,723 | A * | 2/2000 | McCormick et al. | 709/206 |
| 6,249,805 | B1 * | 6/2001 | Fleming, III | 709/206 |
| 6,393,464 | B1 * | 5/2002 | Dieterman | 709/206 |
| 6,421,709 | B1 * | 7/2002 | McCormick et al. | 709/206 |
| 6,505,233 | B1 * | 1/2003 | Hanson et al. | 709/204 |
| 6,708,205 | B2 * | 3/2004 | Sheldon et al. | 709/206 |
| 6,732,157 | B1 * | 5/2004 | Gordon et al. | 709/206 |
| 7,058,684 | B1 * | 6/2006 | Ueda | 709/206 |
| 7,076,527 | B2 * | 7/2006 | Bellegarda et al. | 709/206 |
| 7,155,484 | B2 * | 12/2006 | Malik | 709/206 |
| 7,249,175 | B1 * | 7/2007 | Donaldson | 709/225 |
| 7,433,924 | B2 * | 10/2008 | Malcolm | 709/206 |
| 7,543,053 | B2 * | 6/2009 | Goodman et al. | 709/224 |
| 2002/0038312 | A1 * | 3/2002 | Donner et al. | 707/200 |
| 2002/0059385 | A1 * | 5/2002 | Lin | 709/206 |
| 2003/0023692 | A1 * | 1/2003 | Moroo | 709/206 |
| 2003/0088633 | A1 * | 5/2003 | Chiu et al. | 709/206 |
| 2003/0149726 | A1 * | 8/2003 | Spear | 709/206 |
| 2003/0158905 | A1 * | 8/2003 | Petry et al. | 709/206 |
| 2004/0054741 | A1 * | 3/2004 | Weatherby et al. | 709/206 |
| 2004/0064734 | A1 * | 4/2004 | Ehrlich | 713/201 |
| 2004/0177110 | A1 * | 9/2004 | Rounthwaite et al. | 709/202 |
| 2004/0210640 | A1 * | 10/2004 | Chadwick et al. | 709/207 |

(Continued)

OTHER PUBLICATIONS

Brain, M., "How Spam Works," http://computer.howstuffworks.com/spam.htm, 7 pages, date printed May 13, 2008.

(Continued)

*Primary Examiner* — Alina N. Boutah
(74) *Attorney, Agent, or Firm* — Baker Botts L.L.P.

(57) ABSTRACT

A system and method for filtering network messages, e.g., electronic mail, are provided. A user-specific blocked list or identified junk sender list is published at a server of a computing network, so when a new e-mail arrives, the server can automatically apply filtering rules based on the user-specific junk sender list and delete the appropriate messages. The method includes the steps of generating a list of unacceptable identities at a server; determining an identity associated with a network message received by the server; comparing the identity with the list of unacceptable identities; and deleting the network message from the server if the identity matches an identity on the list of unacceptable identities.

16 Claims, 4 Drawing Sheets

U.S. PATENT DOCUMENTS

| | | | |
|---|---|---|---|
| 2004/0221012 A1* | 11/2004 | Heumesser | 709/206 |
| 2004/0221016 A1* | 11/2004 | Hatch et al. | 709/207 |
| 2004/0249895 A1* | 12/2004 | Way | 709/206 |
| 2004/0267886 A1* | 12/2004 | Malik | 709/206 |
| 2005/0015455 A1* | 1/2005 | Liu | 709/207 |
| 2005/0022014 A1* | 1/2005 | Shipman | 713/201 |
| 2005/0055404 A1* | 3/2005 | Kitchen | 709/206 |
| 2005/0097174 A1* | 5/2005 | Daniell | 709/206 |
| 2005/0108337 A1* | 5/2005 | Lorenz | 709/206 |
| 2005/0108340 A1* | 5/2005 | Gleeson et al. | 709/206 |
| 2005/0114452 A1* | 5/2005 | Prakash | 709/206 |
| 2005/0160144 A1* | 7/2005 | Bhatia | 709/206 |
| 2005/0188023 A1* | 8/2005 | Doan et al. | 709/206 |
| 2005/0198145 A1* | 9/2005 | Davis | 709/206 |
| 2005/0198518 A1* | 9/2005 | Kogan et al. | 713/188 |
| 2005/0210106 A1* | 9/2005 | Cunningham | 709/206 |
| 2005/0216588 A1* | 9/2005 | Keohane et al. | 709/225 |
| 2005/0246420 A1* | 11/2005 | Little, II | 709/204 |
| 2006/0015868 A1* | 1/2006 | Rechterman et al. | 718/1 |
| 2006/0031298 A1* | 2/2006 | Hasegawa | 709/206 |
| 2006/0031303 A1* | 2/2006 | Pang | 709/206 |
| 2006/0037070 A1* | 2/2006 | Davis et al. | 726/11 |
| 2006/0168006 A1* | 7/2006 | Shannon et al. | 709/206 |
| 2007/0294351 A1* | 12/2007 | El-Emam | 709/206 |
| 2008/0147808 A1* | 6/2008 | Pang | 709/206 |
| 2009/0110275 A1* | 4/2009 | Ahmed | 382/170 |
| 2009/0132669 A1* | 5/2009 | Milliken et al. | 709/206 |
| 2010/0100944 A1* | 4/2010 | Fleming, III | 726/4 |

OTHER PUBLICATIONS

Brain, M., et al., "How E-mail Works," http://computer.howstuffworks.com/email.htm, 10 pages, date printed May 13, 2008.

Tyson, J., et al., "How Instant Messaging Works," http://computer.howstuffworks.com/instant-messaging.htm, 6 pages, date printed May 13, 2008.

Cranford-Petelle, B., "Pop-Up Talk, Instant Messaging Is Quicker Than E-Mail & Available in Real-Time," How Computers Work, pp. 199-201, 204.

Communication pursuant to Article 96(2) EPC, Reference No., J0004903EP, Appln. No. 04 814 604.7-1525, 5 pages, Oct. 25, 2006.

Bhatia, "System and Method for Filtering Network Messages," U.S. Appl. No. 10/745,851, filed Dec. 23, 2003, pending.

Official Action for U.S. Appl. No. 10/745,851, Confirmation No. 2927, notification date Nov. 2, 2007.

Official Action for U.S. Appl. No. 10/745,851, Confirmation No. 2927, notification date Jun. 12, 2008.

Official Action for U.S. Appl. No. 10/745,851, Confirmation No. 2927, notification date Sep. 3, 2008.

Official Action for U.S. Appl. No. 10/745,851, Confirmation No. 2927, notification date Sep. 24, 2008.

U.S. Patent and Trademark Office, Office Action for U.S. Appl. No. 10/745,851, filed Dec. 24, 2003, Rishi Bhatia, electronically mailed Apr. 16, 2009.

U.S. Patent and Trademark Office, Advisory Action for U.S. Appl. No. 10/745,851, filed Dec. 24, 2003, Rishi Bhatia, electronically mailed Aug. 18, 2009.

U.S. Patent and Trademark Office, Office Action for U.S. Appl. No. 10/745,851, filed Dec. 24, 2003, Rishi Bhatia, electronically mailed Apr. 16, 2009.

* cited by examiner

SYSTEM AND METHOD FOR FILTERING NETWORK MESSAGES

BACKGROUND

1. Field

The present disclosure relates generally to data processing and communication systems, and more particularly, to a system and method for filtering network messages, e.g., electronic mail, at a network server via a user-specific unacceptable, e.g., junk sender, list.

2. Description of the Related Art

In recent years, the availability of more efficient, reliable and cost-effective computers and networking tools has allowed many companies and individuals to become involved in an ever-growing electronic community. The immeasurable gains in technology experienced by the computer industry overall have allowed these users to rely on commercially available computers, such as personal computers ("PCs"), to meet their information processing and communication needs. To that end, PC manufacturers may equip PCs with an interface (such as a modem) that may be used for communication over networks, such as the Internet. The Internet is a well-known collection of networks (e.g., public and private voice, data, video and multimedia networks) that cooperate using common protocols to connect computers around the world.

The combination of inexpensive personal computers and easy-to-use graphical software has enabled the Internet to become a major medium for communications. Two extremely popular methods of communicating via the Internet, or any known network, are electronic mail, e.g., e-mail, and instant messaging, also known as IM.

E-mail is a method of sending and receiving electronic messages and files, over a computer network, e.g. the Internet. E-mail consists of a text message normally typed on a computer keyboard in an e-mail software application, for example, an e-mail client such as Microsoft™ Outlook or Lotus™ Notes. Some e-mail software applications support HTML (Hypertext Markup Language) to let users incorporate formatted text and graphics within their e-mail messages. In addition to a text message, e-mail software applications also let users transmit computer files by attaching the file to the e-mail message. The availability of Web-based software is making e-mail even more accessible due to the fact Web-based e-mail is stored on a Web site that can be accessed from any computer with an Internet connection.

Instant messaging ("IM") enables a user to send messages to another user that immediately appear on that user's computer screen over a network. Instant messaging can work on inter-office LANs (local-area networks) as well as the Internet. Instant messages are different from e-mail messages in that they do not sit unread until the user checks his or her e-mail; they appear on-screen as they are received in real time.

Various software applications with simple to use graphical user interfaces (GUI) have made these methods of communication available to those with little or no computer or programming skills and enable a network user to send a single network message to a large amount of recipients with little effort and at virtually no cost. This ease of use and low cost delivery method has resulted in a large amount of unsolicited messages, e.g., spam, reaching network users' mail inboxes everyday. According to an ECommerce Times® report, published in December 2003, spam costs $20 billion each year in lost productivity. Spam is a growing problem and many experts believe this problem will increase in the years to come. The United States Government has passed some legislation to curb spam, e.g., the Controlling the Assault of Non-Solicited Pornography and Marketing (CAN-SPAM) Act, but conceivably, spammers can skirt some requirements or conduct their business from outside the jurisdiction of the United States, leaving only the right technological solution as an answer to this problem.

Industry is aggressively working to solve this problem and have attempted to implement various anti-spamming strategies. For example, spam filtering software has been developed, which searches keywords in the subject line or text of the e-mail to attempt to identify and delete spam. More advanced filtering software attempt to statistically identify spam based on word patterns or word frequency. Once the filter decides that an e-mail is spam, the filter places it in a special folder, the end user is notified by an e-mail that they have received a spam e-mail and the end user is given a chance to release/delete this e-mail. However, the simple filters are easily fooled by simple spelling variations and the advanced filters can be worked around by adding random words to messages and by using short messages with no identifiable pattern. Additionally, the various filters end up blocking messages that the recipient actually wants.

Therefore, a need exists for techniques to allow computer users to establish user-specific lists for blocking unsolicited and undesirable electronic messages.

SUMMARY

A system and method for filtering network messages, e.g., electronic mail, instant messages, etc. are provided. According to the principles of the present disclosure, a user-specific blocked list or identified junk sender list is published at the server of a computing network, so when a new e-mail arrives, the server can automatically apply filtering rules based on the user-specific junk sender list and delete the appropriate messages. The teachings of the present disclosure permits the mail server to handle the user-specific junk e-mail, and gives more control to the user in what gets filtered.

According to an aspect of the present disclosure, a method for filtering network messages in a computer system incorporating a server and at least one client, includes the steps of generating a list of unacceptable identities within a database accessible by a server, determining an identity associated with a network message received by the server, comparing the identity with the list of unacceptable identities, and deleting the network message from the server if the identity matches an identity on the list of unacceptable identities. The method may further include the step of transmitting the network message to the at least one client if the identity does not match an identity on the list of unacceptable identities.

In accordance with one embodiment, the step of generating a list includes marking a network message received by the at least one client as an unacceptable message, establishing an identity associated with the unacceptable message, and adding the identity associated with the unacceptable message to the list of unacceptable identities within the database. With this embodiment, the step of establishing an identity is performed by the at least one client. The step of adding the identity preferably includes polling the at least one client with the server to obtain the identity associated with the unacceptable message. Polling of the at least one client may be performed by the server at a predetermined frequency.

In accordance with another embodiment, the step of generating a list includes forwarding an unacceptable network message, received by the at least one client, to the server, establishing an identity associated with the unacceptable network message at the server, and adding the identity associated with the unacceptable message to the list of unacceptable identities within the database if the identity is not previously included in the list.

As a further alternative, the step of generating a list may include the step of inputting an unacceptable identity into the database via a server interface.

The network message is one of an electronic mail message and an instant message and the identity is one of an e-mail address, IP address, domain and user name. The network may be selected from the group consisting of a local area network, a wide area network or the Internet.

In a further aspect of the present disclosure, a program storage device is disclosed. The program storage device is readable by a machine, tangibly embodying a program of instructions executable by the machine to perform any of the afore-mentioned method steps for filtering network messages.

In another aspect, a computer system for filtering network messages including at least one server and at least one client is provided. The system includes means for generating a list of unacceptable identities at the at least one server; means for determining an identity associated with a network message; means for comparing the identity with the list of unacceptable identities; and means for deleting the network message at the at least one server if the identity matches an identity on the list of unacceptable identities.

In still a further aspect of the present disclosure, a server for filtering network messages in a computer system is disclosed. The server includes means for generating a list of unacceptable identities; means for determining an identity associated with a network message; means for comparing the identity with the list of unacceptable identities; and means for deleting the network message if the identity matches an identity on the list of unacceptable identities.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
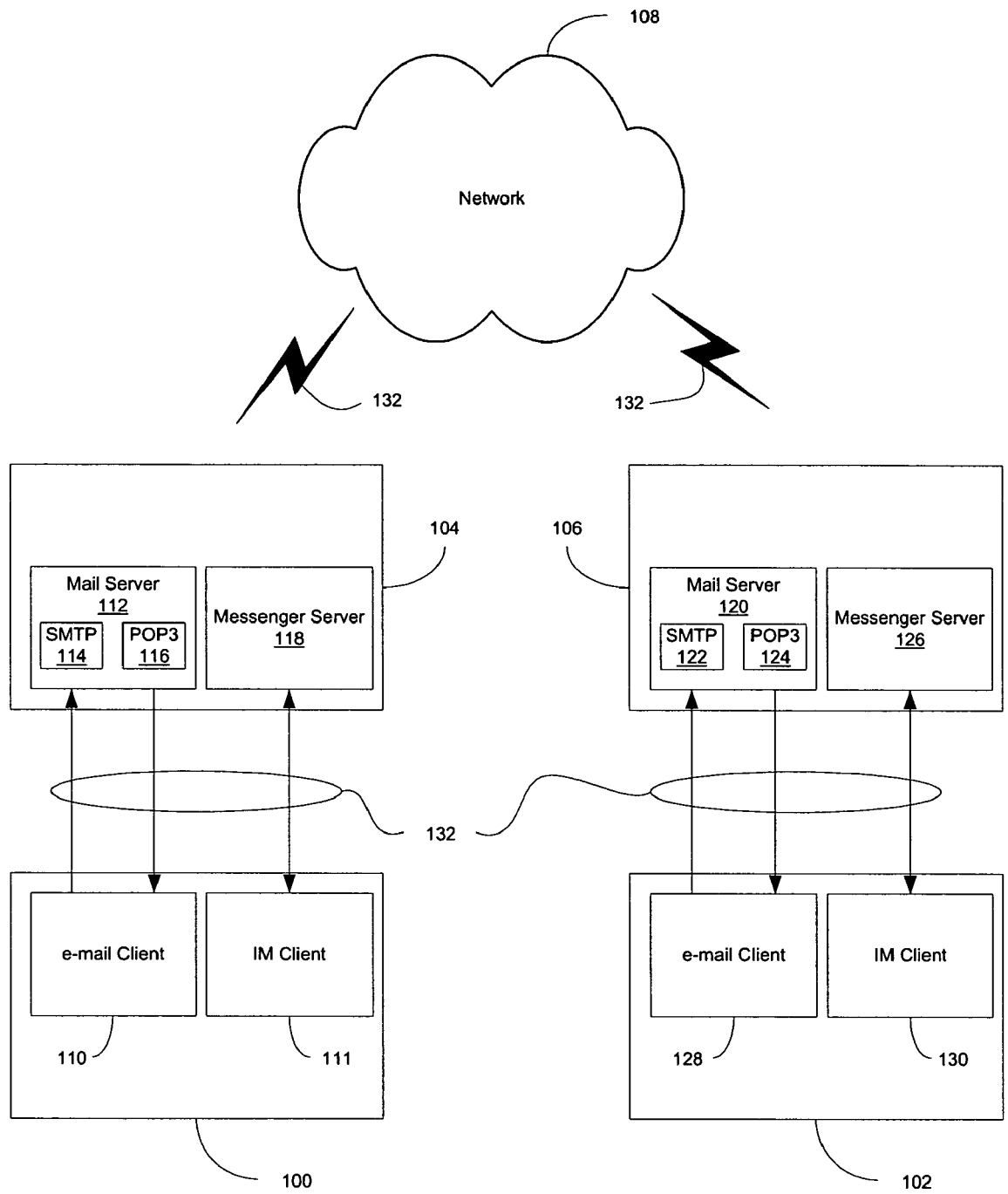
FIG. 1 is a block diagram of an exemplary system for filtering network messages in accordance with an embodiment of the present disclosure.

Preferred embodiments of the present disclosure will be described hereinbelow with reference to the accompanying drawings. In the following description, well-known functions or constructions are not described in detail to avoid obscuring the present disclosure in unnecessary detail.

A system and method for filtering network messages, e.g., electronic mail, are provided. According to the principles of the present disclosure, a user-specific blocked list or identified junk sender list is published at the server of a computing network, so when a new e-mail arrives, the server can automatically apply filtering rules based on the user-specific junk sender list and delete the inappropriate messages.

Conventionally, many e-mail clients allow a user to mark an e-mail as junk e-mail. For the purposes of this disclosure, junk e-mail refers to junk, unsolicited or adult-orientated e-mail, i.e., any undesired e-mail message. First, a user identifies and marks a particular e-mail as junk e-mail that results in a sender of the particular e-mail being marked as a junk sender by an e-mail client. The e-mail client, e.g., Microsoft™ Outlook, will add the sender to a junk sender list. This list of junk senders is stored by the client application. Next time a new e-mail arrives, filtering rules on the client filters out any e-mail from the previously established junk sender list. So when a new e-mail from a previously marked junk e-mail sender arrives in the client's folder (INBOX), the client program will apply all the junk filtering rules and then determine if the e-mail came from a junk e-mail sender. If the e-mail did come from a junk e-mail sender, the client application places the e-mail in the "Deleted Items" folder. The user is notified that the new e-mail has arrived, which is distracting and can be time consuming depending on the number of received e-mails.

According to the principles of the present disclosure, a software application embedded in a mail server of a computing network will poll the e-mail client and retrieve a user-specific junk sender list. The polling will be done for all the users in a network, e.g., employees of an organization, at a predetermined time and a predetermined frequency. The embedded application will maintain the user-specific junk sender list and through a secured web connection permit the user to make modifications. The user will be able to also manually add or delete a junk sender and even mark a whole domain as a junk sender. The user-specific junk sender list enables the embedded application to create a user specific query or filter. Now when a new e-mail arrives, the embedded application will determine a destination user or intended recipient, and run the query against the junk sender list of the destination user. If the e-mail fails to pass this filter, it is automatically deleted by the embedded application at the server; otherwise, if the e-mail passes this filter, the e-mail will be sent to its destination via normal processing.

Referring to FIG. 1, an exemplary system for filtering network messages is illustrated. Generally, the system includes at least one computer 100, 102 for sending/receiving network messages. Each computer 100, 102 is coupled to at least one server 104, 106, e.g., an Internet Service Provider (ISP), for coupling the computers 102, 104 to a network 108, for example, the Internet.

Although the system of FIG. 1 is depicted with a plurality of computers 102, 104 communicating via ISPs over the Internet, it is to be appreciated that network 108 may be a local area network (LAN), wide area network (WAN) or any known network that couples a plurality of computers to enable various modes of communication via network messages. For example, the system may be a corporate intranet including a single server and multiple personal computers housed within a single facility, or alternatively, multiple servers with multiple personal computers located in various geographic locations.

Figure 2:
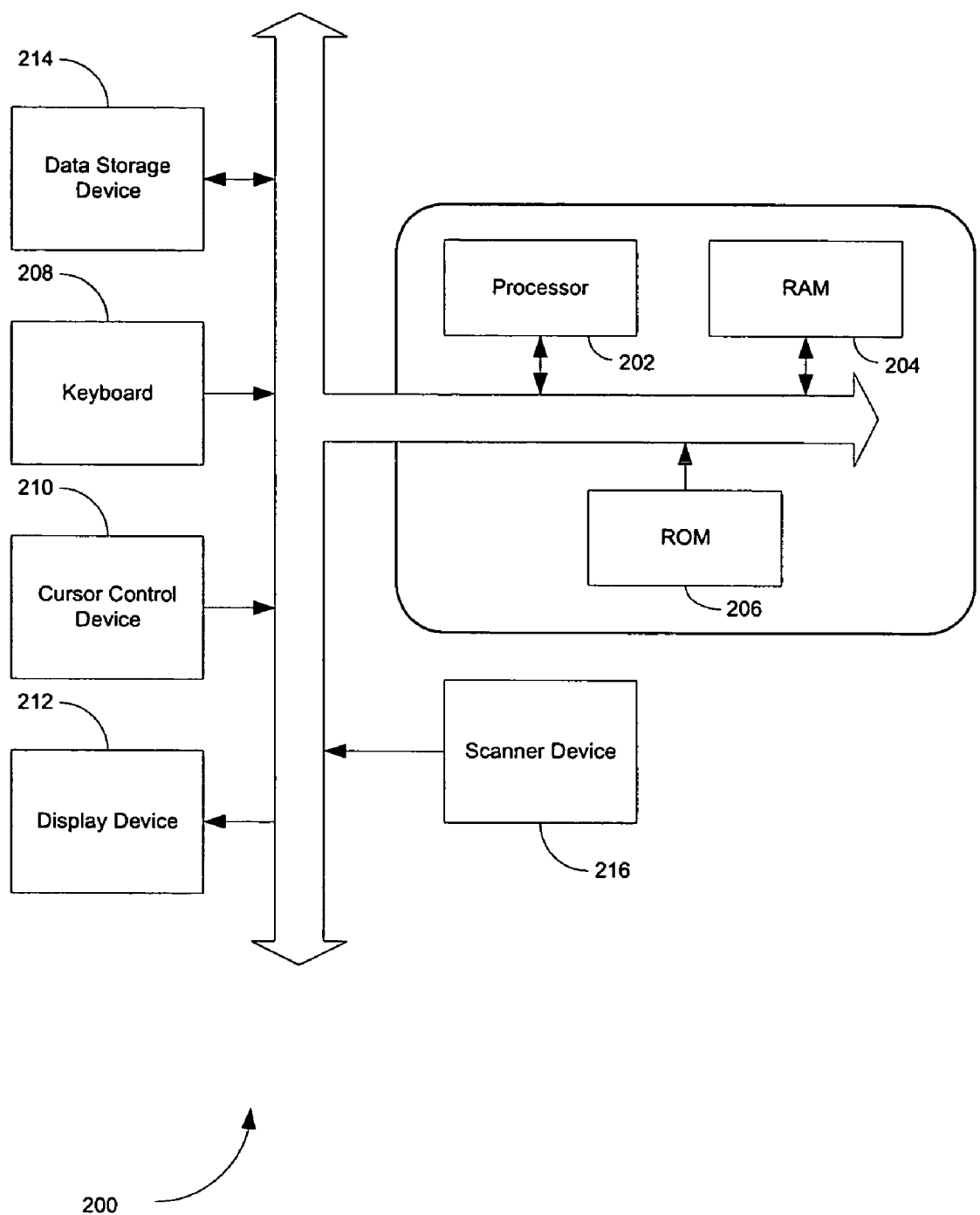
FIG. 2 is an exemplary computer for use in the system shown in FIG. 1.

It is to be understood that the present invention may be implemented in various forms of hardware, software, firmware, special purpose processors, or a combination thereof. In one embodiment, the present disclosure may be implemented in software as an application program tangibly embodied on a program storage device. The application program may be uploaded to, and executed by, a machine including any suitable architecture such as personal computers 100, 102 or servers 104, 106. One suitable machine for executing these functions is illustrated in FIG. 2. Machine 200 is implemented on a computer platform having hardware such as one or more central processing units (CPU) 202, a random access memory (RAM) 204, a read only memory (ROM) 206 and input/output (I/O) interface(s) such as a keyboard 208, cursor control device 210 (e.g., a mouse or joystick) and display device 212. The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device, a printing device and a scanning device 216. It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

Referring again to FIG. 1, personal computers 100, 102 will include client software applications for enabling network communications, e.g., an e-mail client 110, 128, such as Microsoft™ Outlook. Servers 104, 106 will be running the appropriate complimentary server application to the client application. For example, to execute e-mail, mail server 112 will be provided with a Simple Mail Transfer Protocol (SMTP) server 114 for handling outgoing e-mail messages and a POP3 (Post Office Protocol version 3) server 116 for handling incoming e-mail messages.

Figure 3:
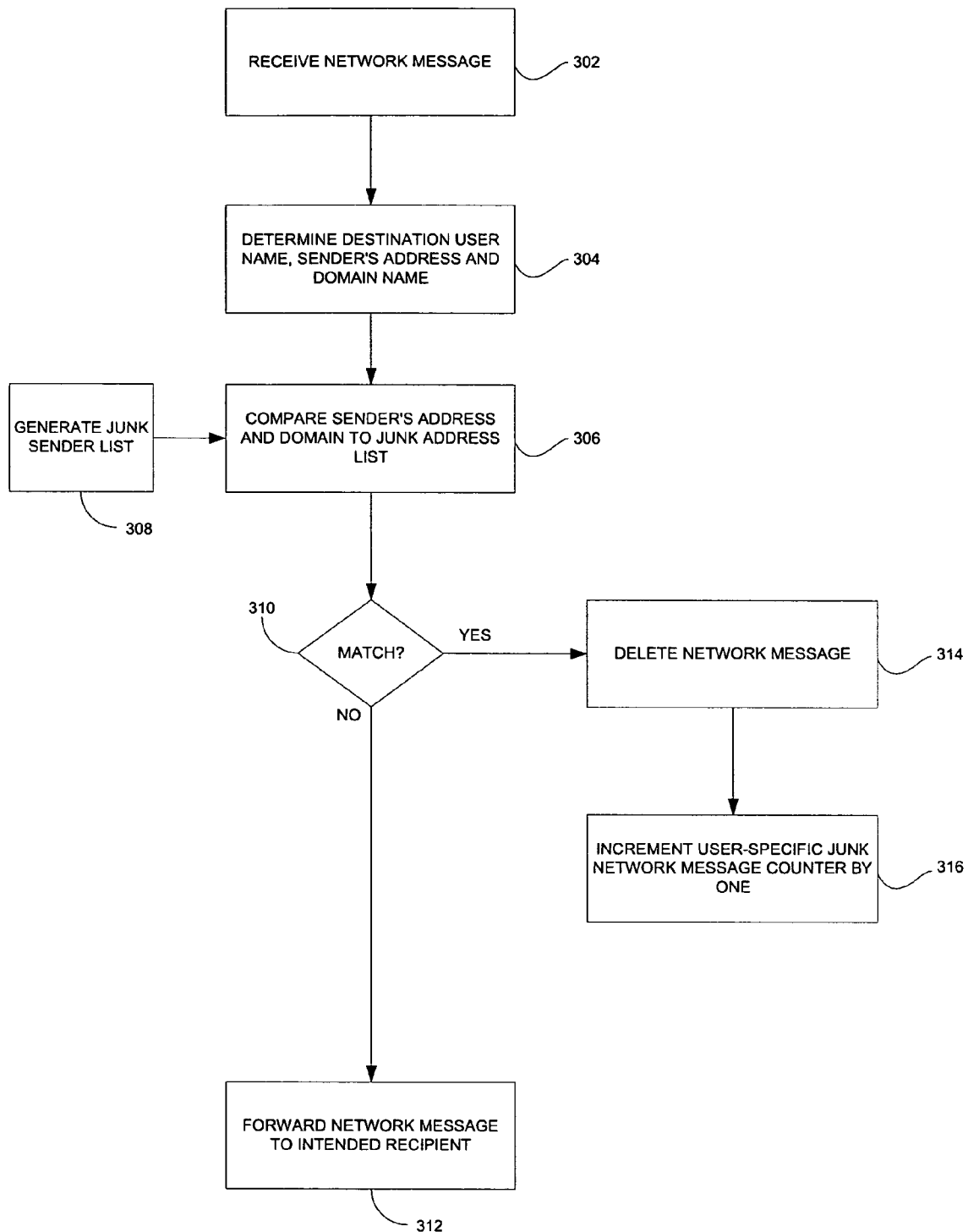
FIG. 3 is a flow chart illustrating a method for filtering network message in accordance with an embodiment of the present disclosure.

With reference to FIGS. 1 and 3, an embodiment of the present disclosure will be described in communicating through e-mail over the Internet. A first network user desires to send an e-mail to another network user, e.g. an intended recipient. The first network user opens an e-mail client 110 residing on personal computer 100. The first network creates a new e-mail by entering an e-mail address of the intended recipient and some text. Upon completion, the personal computer 100 sends the e-mail via SMTP to the mail server 112 of the ISP server 104. The SMTP server 114 of ISP server 104 then transfers the e-mail message via the Internet 108 to the SMTP server 122 of the ISP server 106 corresponding to the entered e-mail address. Once reached, the SMTP server 122 hands the message to the POP3 server 124 for delivery to the intended recipient.

It is to be understood that if the intended recipient had the same Internet Service Provider (ISP) 104 as the first network user, e.g., the sender, the e-mail would simply have been handed off from the SMTP server 114 to the POP3 server 116.

Once ISP server 106 has received the e-mail, e.g., the network message (step 302), the server 106 will determine the destination user name (e.g., the e-mail address of the intended recipient), and the sender's address and domain name (step 304). Next, ISP server 106 will compare the address of the sender of the e-mail to a user-specific junk sender list of the intended recipient to determine if the intended recipient is receiving e-mails from the specific sender or any e-mails from the domain of the sender (step 306). It is to be understood that ISP server 106 may use any identifier available to determine if the sender is on the user-specific junk sender list. For example, ISP server 106 may use the sender's e-mail address, e.g., johndoe@domain.com, user name, or alternatively, may use the IP (Internet Protocol) address of the originating computer 100 which is sent along with the e-mail. Furthermore, the server may generally use just the domain the e-mail was sent from, e.g., domain.com, and identify any e-mail with the same domain.

The junk sender or address list is preferably initially generated at the server 106 (step 308) and/or stored in a database accessible by the server. The generation of the junk sender list will be described in greater detail hereinbelow.

Referring still to FIGS. 1 and 3, if the sender's identifier, e.g., e-mail address or domain, matches an identifier on the junk sender list (step 310), the network message is deleted (step 314). The term "deleted" is to be construed to include deletion, removal, tagging, segregation and/or forwarding of the network message to an auxiliary designated "junk" mailbox. A counter optionally associated with the intended recipient may be incremented by one (step 316) to record the number of deleted network messages, i.e., to trace how many junk e-mails have been automatically deleted by the server 106. An administrator will be able to view this counter for the whole network, e.g., a specific organization. The user will be able to view the counter for his/her e-mail account. The administrator may manually reset the counter or provide policies for the server to automatically reset it.

Otherwise, if the sender's identifier does not matches an identifier on the user-specific junk address list published at the server (step 310), the e-mail will be placed in the intended recipient's mailbox on the POP3 server 124 awaiting to be transferred to the recipient's e-mail client 128 (step 312).

It is to be appreciated that computer 100, 102 may be any computing device capable of sending and receiving network messages, for example, a laptop/notebook computer, a mobile telephone, a personal digital assistant (PDA) such as a Pocket PC™, Palm™, etc. Furthermore, the computing devices 100, 102 may communicate to the servers 104, 106 and network 108 via any known communication link 132, for example, dial-up, hardwired, cable, DSL, satellite, cellular, PCS, wireless transmission (e.g., 802.11a/b/g), etc.

As a further embodiment, the teachings of the present disclosure may be applied to instant messaging. For example, the personal computers 100, 102 may include an instant messaging client 111, 130 such as AOL™ Instant Messenger (AIM), ICQ™, and MSN™ Messenger, and corresponding servers 104, 106 will execute the appropriate messenger server application 118, 126. In this embodiment, the receiving messenger server 126 will access the user-specific junk sender list to determine if the user name of the IM sender is on the list. If the IM sender is on the user-specific junk sender list, the messenger server 126 will not grant the IM sender access to the intended IM client 130. Advantageously, this embodiment will prevent annoying IMs from popping up on the user's computer screen and having the user click an "Ignore" button to dismiss the IM resulting in useless user down-time, i.e., lost productivity.

Figure 4:
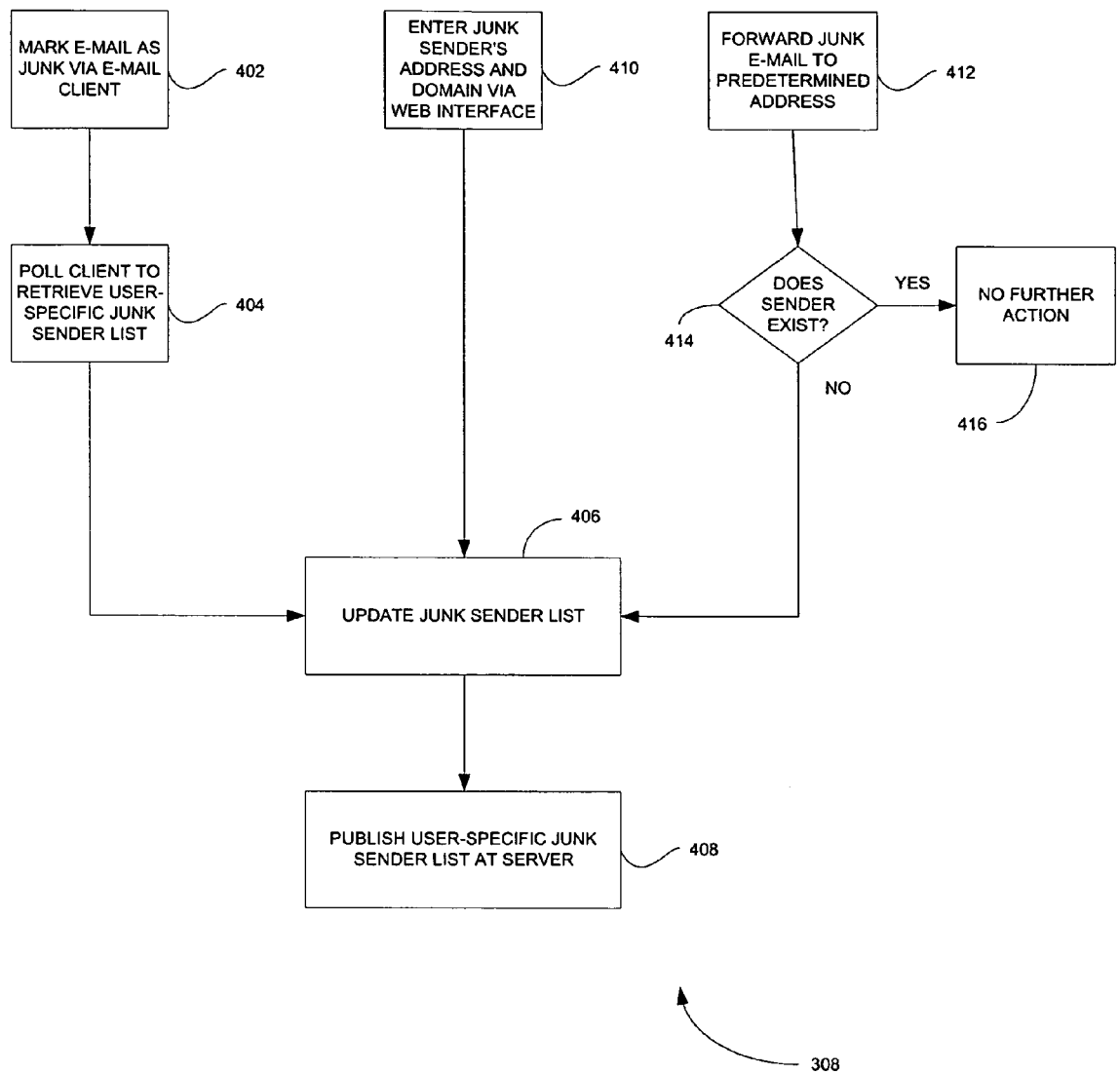
FIG. 4 is a flow chart illustrating a method for generating a user-specific junk sender list in accordance with an embodiment of the present disclosure.

With reference to FIG. 4, the generation of the junk sender list associated with Step 308 of FIG. 3 will now be described. In one preferred embodiment, a user can mark an e-mail as junk from the e-mail client such as Microsoft™ Outlook (step 402). In Outlook, this can be accomplished by going to the Actions menu item and selecting "Junk E-Mail" and then selecting one of the two actions "Add to Junk sender's List" or "Add to Adult Content Senders List". This action will add the senders e-mail address to the junk e-mail sender list stored at the client. For Outlook, the user must first enable the Junk filtering process by clicking Organize and enabling the "Junk E-Mail" option. After this feature is enabled, the user can mark any e-mail sender as junk or adult-oriented. The user can manage the list of junk and adult senders by going back to the Organize feature of the client.

Once the junk sender list is complied at the client, the server, preferably the mail server 120, will poll the client 128 to retrieve the user-specific junk sender list at a predetermined time (step 404). An e-mail administrator of the network may establish policies at the server that controls when the polling process starts and at what frequency it occurs. At a predetermined time, the server will poll all the running machines with an active e-mail client. The embedded application in the server will query the e-mail client for the user account name, and the junk/adult sender list. The server application will use this list and merge it with the existing stored list (step 406). The merge process will add all the new entries from the retrieved list. This information may be published or stored by the server application in any format such as secured XML files or database tables (step 408).

Alternatively, a user interface will allow the user to generate the junk sender list over the network via a secure connection (step 410). Here, the user interface will provide the user with the ability to add or delete a junk sender's e-mail address to the junk sender list. The user interface will additionally allow the user to mark specific domains as junk senders.

Furthermore, the user interface will include a central policy manager where an administrator of the network can set the time and frequency of the polling of the individual clients.

In another embodiment of the present disclosure, the junk sender list may be generated by having the user forward the junk e-mail to a pre-designated generic address at the server (step 412). Now, when the mail server 120 receives this e-mail, the embedded application extracts the information it needs from the user-sent e-mail, e.g. the junk sender e-mail address and the user name of the user that forwarded the e-mail, and to establish the identity of the sender. If the junk sender already exists on the list (step 414), no further action is required (step 416); however, if the information does not exists, then it is automatically added to the user-specific junk sender list (step 406). The benefits of this implementation are: the e-mail server or the embedded application doesn't have to poll the e-mail client saving bandwidth and system resources; its beneficial where the e-mail client doesn't support the feature to maintain the junk sender list; and it allows the user to forward the e-mail from any e-mail capable device such as a laptop, personal digital assistant (PDA), mobile phone, etc.

A system and method for filtering user-specific junk e-mails in a network of computers have been described. Advantageously, since the server automatically deletes the unwanted e-mail at the server, the network will not be cluttered by unwanted e-mail and the network bandwidth is better utilized. Further, since the unwanted network messages will never reach the client, i.e., the user, productivity will not be lost by wading through numerous junk messages.

Since the user-specific junk address list is published at the server, a user will realize the filtering method of the present disclosure no matter how the user accesses his e-mail and will eliminate the need for the user to establish junk filtering rules at every client utilized. Conventionally, junk filtering rules are stored at the client so if the user checks his e-mail from a different client, for example, from his home computer or using a web client, the unwanted e-mail is never filtered. The user will still have to manually identify and delete the junk e-mail. By storing the user-specific junk address list at the server, these deficiencies will be overcome. Users having limited network connections, e.g., a dial-up connection, will benefit by receiving less total e-mails reducing their connection time.

Moreover, by eliminating unwanted messages before they reach the client, the system and method of the present disclosure will enable better usability of portable devices. Currently, many different kinds of portable devices allow a user to check e-mail, for example, mobile telephone, PDA's, etc.; however, these devices employ complex user interfaces because of the limited screen space which makes it more cumbersome to deal with junk e-mails on these devices. Also, most users are paying per minute to check e-mail on their wireless portable devices. By eliminating junk e-mails, the user of the portable device will have to deal with less mail and will require a shorter connection time resulting in cost savings. The teaching of the present disclosure of automatically deleting the user established junk sender e-mail's by the server of a computer network instantly provides better usability, time, cost saving and better utilization of the resources available to the user.

While the invention has been shown and described with reference to certain preferred embodiments thereof, it will be understood by those skilled in the art that various changes in form and detail may be made therein without departing from the spirit and scope of the disclosure as defined by the appended claims.

What is claimed is:

1. A method for filtering network messages in a computer system including a server and at least one email client, the method comprising the steps of:

generating one or more lists of unacceptable identities within a database accessible by a server, wherein each of the one or more lists is user-specific to a particular user of the at least one email client;

polling the at least one email client with the server to automatically obtain one or more updated lists of unacceptable identities, the updated lists stored at the at least one email client;

merging the one or more updated lists into the one or more lists of unacceptable identities stored within the database;

determining an identity associated with a network message received by the server;

determining an intended recipient of the network message;

selecting a user-specific list of unacceptable identities that corresponds to the intended recipient;

comparing, at the server, the identity with the user-specific list of unacceptable identities; and deleting the network message from the server if the identity matches an identity on the user-specific list of unacceptable identities.

2. The method according to claim 1 including the step of transmitting the network message to the at least one client if the identity does not match an identity on the user-specific list of unacceptable identities.

3. The method according to claim 1 wherein the step of generating a list includes the steps of:

marking a network message received by the at least one client as an unacceptable message;

establishing an identity associated with the unacceptable message; and adding the identity associated with the unacceptable message to the list of unacceptable identities within the database.

4. The method according to claim 3 wherein the step of establishing an identity is performed by the at least one client.

5. The method according to claim 4 wherein the step of adding the identity includes the step of polling the at least one client with the server to obtain the identity associated with the unacceptable message.

6. The method according to claim 5 wherein the step of polling the at least one client is performed by the server at a predetermined frequency.

7. The method according to claim 1 wherein the step of generating a list include the steps of:
   forwarding an unacceptable network message, received by the at least one client, to the server;
   establishing an identity associated with the unacceptable network message at the server; and
   adding the identity associated with the unacceptable message to the list of unacceptable identities within the database if the identity is not previously included in the list.

8. The method according to claim 1 wherein the step of generating a list includes the step of inputting an unacceptable identity into the database via a server interface.

9. The method according to claim 1 wherein the network message is one of an electronic mail message and an instant message.

10. The method according to claim 1 wherein the identity is one of an e-mail address, IP address, domain and user name.

11. The method according to claim 1 wherein the network is selected from the group consisting of a local area network, a wide area network or the Internet.

12. The method according to claim 1 further comprising the step of incrementing a counter for each deleted network message.

13. A program storage device readable by a machine, tangibly embodying a program of instructions executable by the machine to perform method steps for filtering network messages, the method steps comprising:
   generating one or more lists of unacceptable identities at least one server, wherein each of the one or more lists is user-specific to a particular user of at least one email client;
   polling the at least one email client with the server to automatically obtain one or more updated lists of unacceptable identities, the updated lists stored at the at least one email client;
   merging the one or more updated lists into the one or more lists of unacceptable identities stored within a database;
   determining an identity associated with a network message received by the at least one server;
   determining an intended recipient of the network message;
   selecting a user-specific list of unacceptable identities that corresponds to the intended recipient;
   comparing, at the at least one server, the identity with the user-specific list of unacceptable identities; and
   deleting the network message at the at least one server if the identity matches an identity on the user-specific list of unacceptable identities.

14. A computer system for filtering network messages including at least one server device, and at least one email client, the server device having stored thereon a program, the program comprising:
   code for generating one or more lists of unacceptable identities at the at least one server, wherein each of the one or more lists is user-specific to a particular user of the at least one email client;
   code for polling the at least one email client with the server to automatically obtain one or more updated lists of unacceptable identities, the updated lists stored at the at least one email client;
   code for merging the one or more updated lists into the one or more lists of unacceptable identities stored within a database;
   code for determining an identity associated with a network message;
   code for determining an intended recipient of the network message;
   code for selecting a user-specific list of unacceptable identities that corresponds to the intended recipient;
   code for comparing, at the at least one server the identity with the user-specific list of unacceptable identities; and
   code for deleting the network message at the at least one server if the identity matches an identity on the user-specific list of unacceptable identities.

15. A server device for filtering network messages in a computer system, the server device having stored thereon a program comprising:
   code for generating one or more lists of unacceptable identities;
   code for polling at least one email client with the server to automatically obtain one or more updated lists of unacceptable identities, the updated lists stored at the at least one email client;
   code for merging the one or more updated lists into the one or more lists of unacceptable identities stored within a database;
   code for determining an identity associated with a network message;
   code for determining an intended recipient of the network message;
   code for selecting a user-specific list of unacceptable identities that corresponds to the intended recipient;
   code for comparing the identity with the user-specific list of unacceptable identities; and
   code for deleting the network message if the identity matches an identity on the user-specific list of unacceptable identities.

16. The method of claim 1, wherein the step of polling the at least one client is performed by the server at a predetermined frequency.

* * * * *